March 1, 1938.    P. W. CALHOUN    2,109,523
DECELEROMETER
Filed Oct. 14, 1936
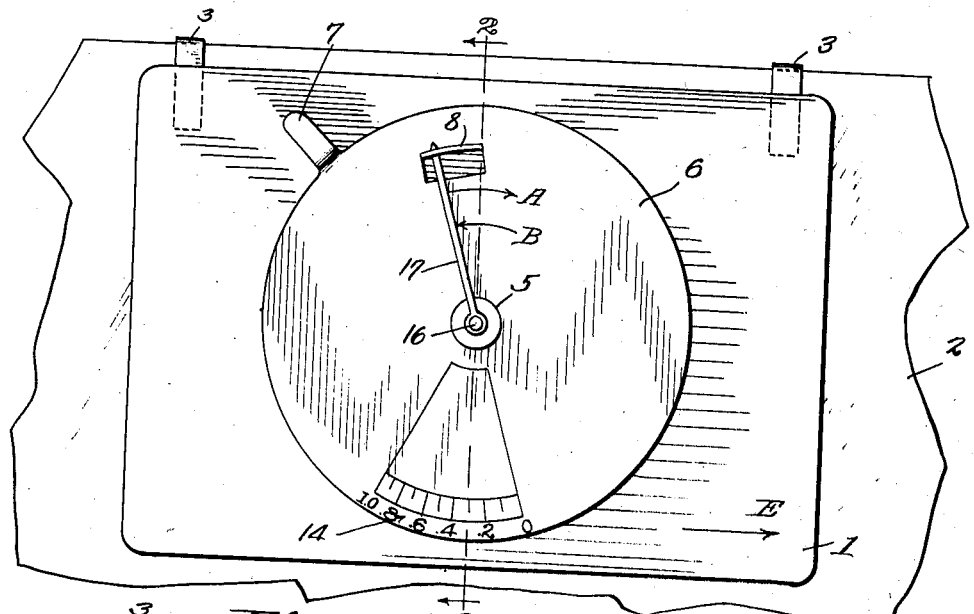
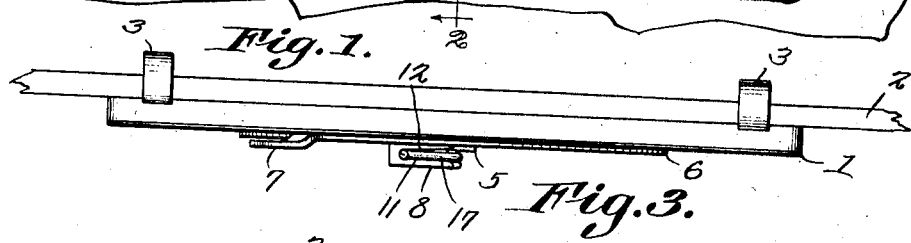
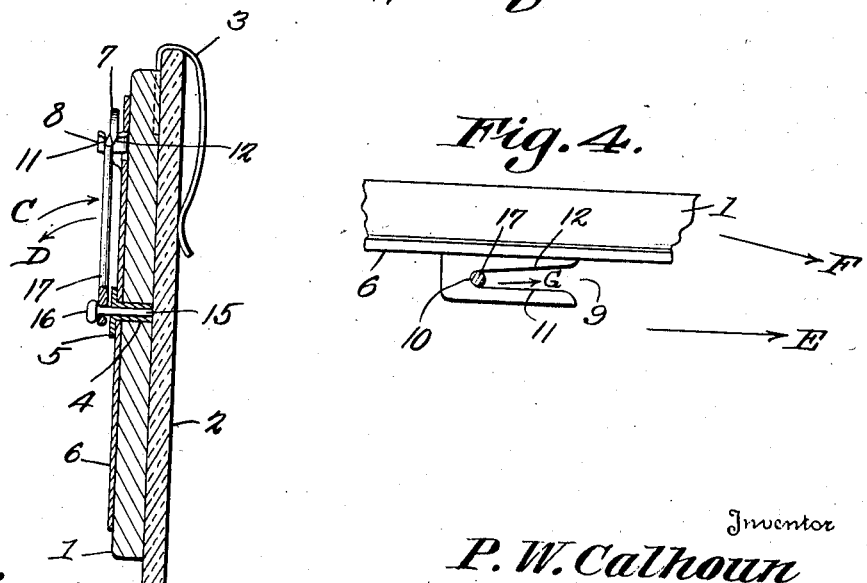
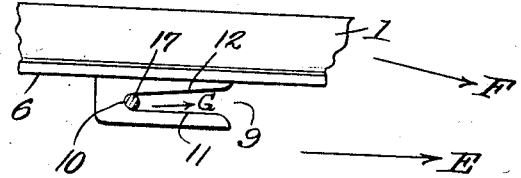
Inventor
P. W. Calhoun
By C. A. Snow & Co.
Attorneys.

Patented Mar. 1, 1938

2,109,523

UNITED STATES PATENT OFFICE 2,109,523

DECELEROMETER

Paul White Calhoun, Madison, Fla.

Application October 14, 1936, Serial No. 105,591

2 Claims. (Cl. 264—1)

Broadly considered, this invention aims to provide a means whereby, through the instrumentality of a pendulum normally held in an upstanding position, but capable of being dislodged from that position when the brakes of a car are applied, the checking power of the brakes may be determined. Another object of the invention is to provide an instrument of the kind hereinbefore alluded to, which may be made so cheaply that it can be sold for a small amount, or be given away as an advertising novelty. A further object of the invention is to provide novel means for preventing a dislodgement of the needle or pendulum, and a downward swinging movement thereof, due to motions in the car not arising out of an application of the brakes.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in elevation, a device constructed in accordance with the invention;

Fig. 2 is a vertical section on the line 2—2 of Fig. 1;

Fig. 3 is a top plan;

Fig. 4 is a top plan of the bracket and attendant parts, upon an enlarged scale.

In carrying out the invention, there is provided a support 1, in the form of a plate, having parallel inner and outer surfaces. The outer surface of the support 1 is placed against the inner surface of a pane 2 which, according to present practice, has vertical sliding adjustment in the side-front door of a motor car, the pane being located at the end of the driver's seat. The support 1 may be removably held on the pane 2 by any suitable means, for instance, by resilient clips 3 carried by the support and engaged over the upper edge of the pane.

A retainer 4 is secured to the support 1 and has a head 5. A rotatable member 6 is mounted to turn for adjustment on the retainer 4, but the head 5 binds the rotatable member against the support 1 with sufficient friction so that the rotatable member will turn only if an operator applies sufficient force to a handle 7 which the rotatable member carries at its periphery.

A bracket 8 is struck from the upper portion of the rotatable member 6 and has a circumferentially extended notch 9. The rear end of the notch 9 forms a seat 10 in the bracket. The inner edge 11 of the notch 9 is parallel to the inner and outer surfaces of the support 1, but the outer edge 12 of the notch is disposed at an acute angle to the inner and outer surfaces of the support 1, the notch 9 being slightly V-shaped, as Fig. 4 will show.

On the lower portion of the rotatable member 6 there is a scale 14. Since, in a brake-testing machine, patentable novelty cannot be predicated upon a specific basis for calibrating a scale, and since the scale may be constructed in various ways without departing from the spirit of the invention, the scale may be dismissed with the observation that it may be calibrated in any way which will answer the end in view.

A pivot element 15 is carried by the retainer 4 and has a head 16. A pendulum 17 is mounted on the pivot element 15, behind the head 16, for swinging movement in a plane parallel to the inner and outer surfaces of the support 1, to wit, in the direction of the arrows A and B in Fig. 1. The pendulum 17 also has swinging movement in a direction transverse to the inner and outer surfaces of the support 1, as indicated by the arrows C and D in Fig. 2.

The seat 10 of the stop bracket 8 and the zero of the scale 14 are in a straight line passing through the axis of the pivot element 15, and the scale reads oppositely to the direction of the advance of the car, that direction being indicated by the arrow E in Figs. 1 and 4. By way of further definition, it may be stated that the notch 9 opens in the direction of advance of the car, namely in the direction of the arrow E, the scale 14 reading in an opposite direction.

Grossly considered, the operation is as follows:

The pendulum 17 is disposed in an upstanding, backwardly-inclined position, as in Fig. 1, the pendulum resting against the seat 10 of the bracket 8, within the notch 9. The rotatable member 6 is turned by the handle 7, in the direction of the arrow A, until the seat 10 and the upstanding pendulum 17 are close to a vertical line 2—2 passing through the axis of the pivot element 15, the seat and the upstanding pendulum being above the pivot element. The car is put in motion, the brakes are applied, and the pendulum 17, responding to inertia, swings to a depending position and after the vehicle is stopped, comes to rest opposite a graduation on the scale 14. A reading on the scale is taken.

The pendulum 17 is restored to its upstanding position, the rotatable member 6 is turned in the direction of the arrow B by steps of progressively-lessening amount, until the pendulum is not dislodged from the bracket 8 when the brakes are applied. The last reading taken on the scale 14, as indicated by the depending pendulum 17, represents with sufficient accuracy, the maximum checking power of the brakes.

Taking up some of the finer points involved, the instrument, when a test is being made, will always be subjected to vibratory motions arising from road irregularities and the operation of the motor, and some of these motions acting in the plane of the member 6, will tend to swing the pendulum 17 downwardly, in the direction of the arrow A, from the lodged upstanding position of Fig. 1 to a depending position.

In practice, this tendency of the pendulum 17 to swing downwardly, due to vibratory or rapid oscillatory movements acting in the plane specified, may, for all practical purposes, be disregarded, due to the presence of similar vibratory or oscillatory movements acting at right angles to the plane of the member 6, or in the direction of the arrows C and D of Fig. 2, and due to the particular shape of the notch 9.

It can be seen in Fig. 4 that the notch 9 is relatively long and narrow. It is intended that the pendulum 17 shall have a little loose motion in the notch 9, so that the pendulum may vibrate in the direction of the arrows C and D of Fig. 2, even when said pendulum rests in the seat 10. Thus it is apparent that when vibratory motions exist in the directions of the arrows C and D, the pendulum 17 will not travel straight out of the notch 9, as per arrow G of Fig. 4, for instance, even though inertial force might impel it to do so, but rather will be struck alternately by the edges 11 and 12 of the notch 9, in rapid succession, and its forward movements thereby will be hindered.

This has been found to reduce the ill effects of vibratory movements formerly arising in the course of a brake test to a negligible minimum. A road jolt might give the pendulum 17 sufficient velocity in the direction of the arrow A to cause the pendulum to pass out of the notch 9 against the retarding effect of the component of gravity acting in the opposite direction, but the accelerating force of said jolt ceases to act when the pendulum 17 leaves the seat 10, whereas the retarding effect of vibration in the direction of the arrows C and D continues to act, and thus bring the pendulum 17 to a halt before it has traveled far enough in the direction of the arrow G to materially affect the performance of the instrument. On the other hand, an inertial force due to the application of the brakes, acting over a comparatively long period of time, a half second or more, if sufficient to overcome the counteracting forces of gravity and friction at the pivot 16 will cause the pendulum 17 to work its way, zigzag fashion, towards and out of the opening of the notch 9, after which it is free to swing rapidly to a depending position.

The foregoing being understood, it might be proposed that the edges 11 and 12 of the notch 9 could be disposed in parallel relation, the pendulum 17 being permitted to oscillate back and forth transversely of the support 1, in the direction of the arrows C and D, the pendulum dropping back by gravity against the seat 10.

There is, however, another consideration to be carried in mind in determining the shape of the notch 9, so far as the angle between its edges 11 and 12 is concerned.

If the pane 2 of Fig. 1 were always disposed parallel to the arrow E in Fig. 4, representing the line of advance of the car, the support 1 would be correspondingly disposed, and a parallel-sided notch 9 might be employed. In many cars, however, the pane 2 is not disposed parallel to the line of advance of the car, but has a more or less pronounced forward and inward inclination, as indicated roughly by the arrow F in Fig. 4. If the pane 2 and the support 1 were inclined forwardly and inwardly, as indicated roughly by the arrow F in Fig. 4, it would not do to make the edge 12 of the notch 9 parallel to the edge 11, because the edge 12 then would be interposed in front of the pendulum 17, and would tend to check the downward movement of the pendulum when the car brakes are applied. From what has been stated last above, it may be assumed that to dispose the edge 12 of the notch at an acute angle to the edge 11 is desirable.

Assuming that, for the practical reasons above stated, the edge 12 of the notch 9 must be disposed at an acute angle to the edge 11 and at an acute angle to the inner and outer surfaces of the support 1, it is to be noted that, as the pendulum 17 swings transversely in the direction of the arrows C and D in Fig. 2, a component in the direction of the arrow G in Fig. 4, parallel to the edge 12, is resolved out of of the aforesaid transverse swinging movement, the component in the direction of the arrow G having a tendency to swing the pendulum 17 out of the notch 9 and to permit the pendulum to drop to a depending position.

In order to avoid the contingency last above described, care must be exercised in determining the inclination of the edge 12 of the notch 9. The angle defined by the edges 11 and 12 of the notch, (conveniently measured by the trigonometric tangent of said angle) must be such, considered relatively to the coefficient of friction between the pendulum 17 and the bracket 8 along the edge 12, that when the pendulum oscillates transversely, as shown in Fig. 2 by the arrows C and D, the component in the direction of the arrow G in Fig. 4 will not be sufficiently great to overcome the friction between the pendulum 17 and the bracket 8 at the edge 12 of the notch.

The end in view is, not to supply an instrument of precision, but to furnish a very simple article which will give satisfactory average result over a wide range, and answer the requirements of a motorist who wishes to know how his brakes are working, and the degree of their perfection within limits defined by such accuracy as the nature of a simple road test demands.

Having thus described the invention, what is claimed is:

1. In a device for testing the brakes of a vehicle, a member carrying a pivot element, means for mounting said member on a vehicle in approximate parallelism to the line of advance of the vehicle, a stop on said member and located above the pivot element and to the rear of a vertical line passing through the pivot element, said member being provided with a rearwardly reading scale located below the pivot element, and a pendulum mounted at one end on the pivot element for swinging movement in approximate parallelism to the line of advance of the vehicle, the pendulum being of such length as to rest against the stop in an upstanding and rearwardly inclined position, the inertia of the pendulum causing it to swing forwardly and out of engagement with the stop, and downwardly into depending and indicating position with respect to the scale, when the vehicle is subjected to braking effort, the pendulum when in said depending and indicating position giving an indication of the angular displacement of the stop only when the vehicle whereon the device is mounted is at rest, the pendulum being mounted on the pivot element for oscillation in a direction approximately at right angles to the line of advance of the vehicle, the stop being provided with a notch, one end of which receives the pendulum when the pendulum is in said rearwardly inclined position, one edge of the notch being inclined toward said member from the base of the notch to the mouth of the notch, the inclination of said edge being such that when the pendulum oscillates in the last-specified direction, the component forwardly along said edge will be offset by frictional contact between the pendulum and said edge, the pendulum then being left free to swing backwardly by gravity into contact with the stop at the base of the notch.

2. In a device for testing the brakes of a vehicle, a member carrying a pivot element, means for mounting said member on a vehicle in approximate parallelism to the line of advance of the vehicle, a stop on said member and located above the pivot element and to the rear of a vertical line passing through the pivot element, said member being provided with a rearwardly reading scale located below the pivot element, and a pendulum mounted at one end on the pivot element for swinging movement in approximate parallelism to the line of advance of the vehicle, the pendulum being of such length as to rest against the stop in an upstanding and rearwardly inclined position, the inertia of the pendulum causing it to swing forwardly and out of engagement with the stop, and downwardly into depending and indicating position with respect to the scale, when the vehicle is subjected to braking effort, the pendulum when in said depending and indicating position giving an indication of the angular displacement of the stop only when the vehicle whereon the device is mounted is at rest, the pendulum being mounted on the pivot element for oscillation in a direction approximately at right angles to the line of advance of the vehicle, the stop being provided with a notch, one end of which receives the pendulum when the pendulum is in said rearwardly inclined position, one edge of the notch being inclined toward said member from the base of the notch to the mouth of the notch, the inclination of said edge being such that when the pendulum oscillates in the last-specified direction, the component forwardly along said edge will be offset by a frictional contact between the pendulum and said edge, the pendulum then being left free to swing backwardly by gravity into contact with the stop at the base of the notch, and means for mounting said member for rotation at the will of an operator and for holding it against rotation otherwise, the rotation of said member serving to adjust the stop toward and away from said vertical line.

PAUL WHITE CALHOUN.